June 8, 1937.  S. W. ALDERFER  2,083,211
APPARATUS FOR THE MANUFACTURE OF ARTICLES DIRECT FROM LATEX SOLUTION
Filed Oct. 15, 1934  4 Sheets-Sheet 1

INVENTOR
STERLING W. ALDERFER
By Albert L. Ely
ATTORNEY

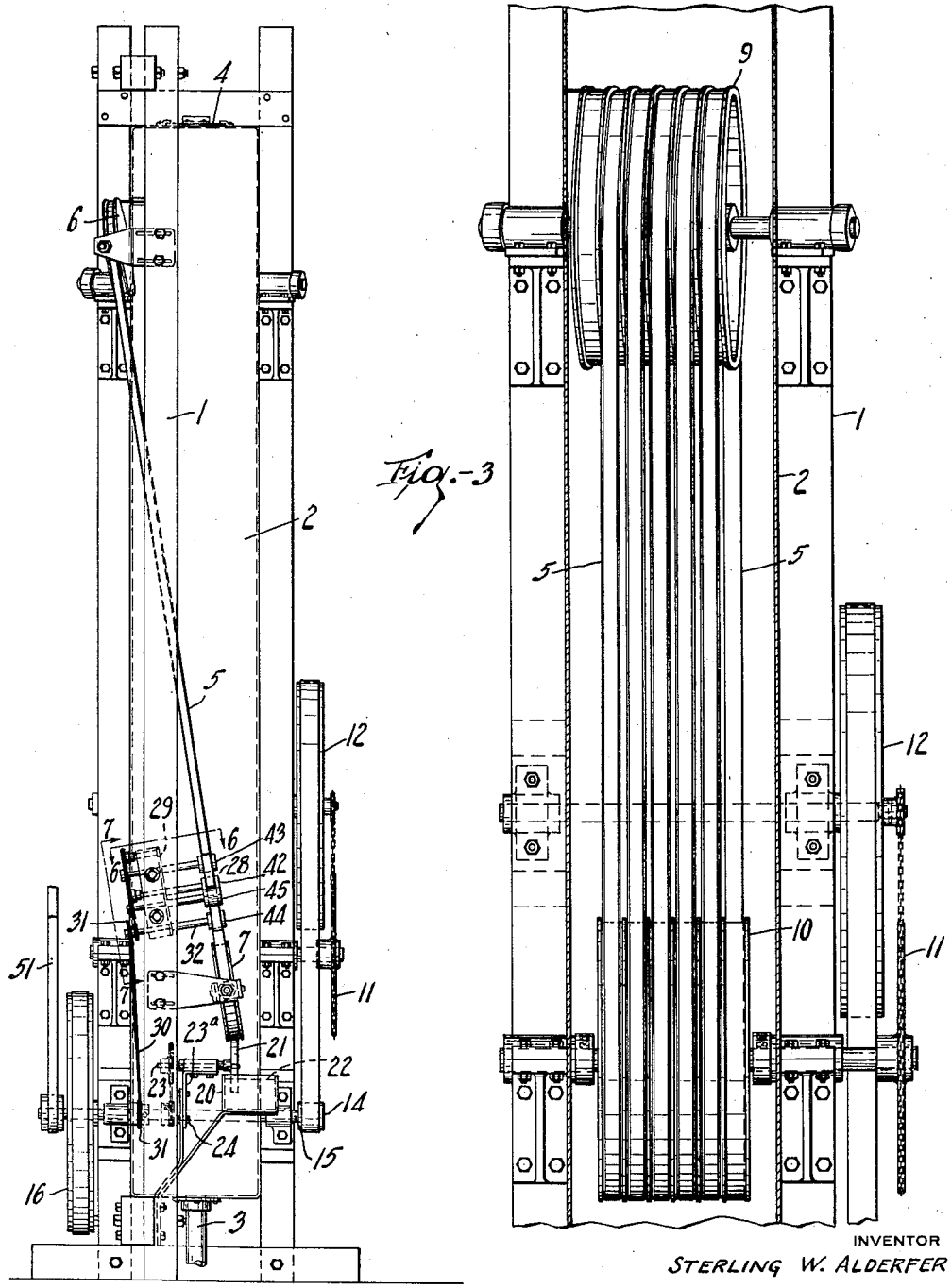

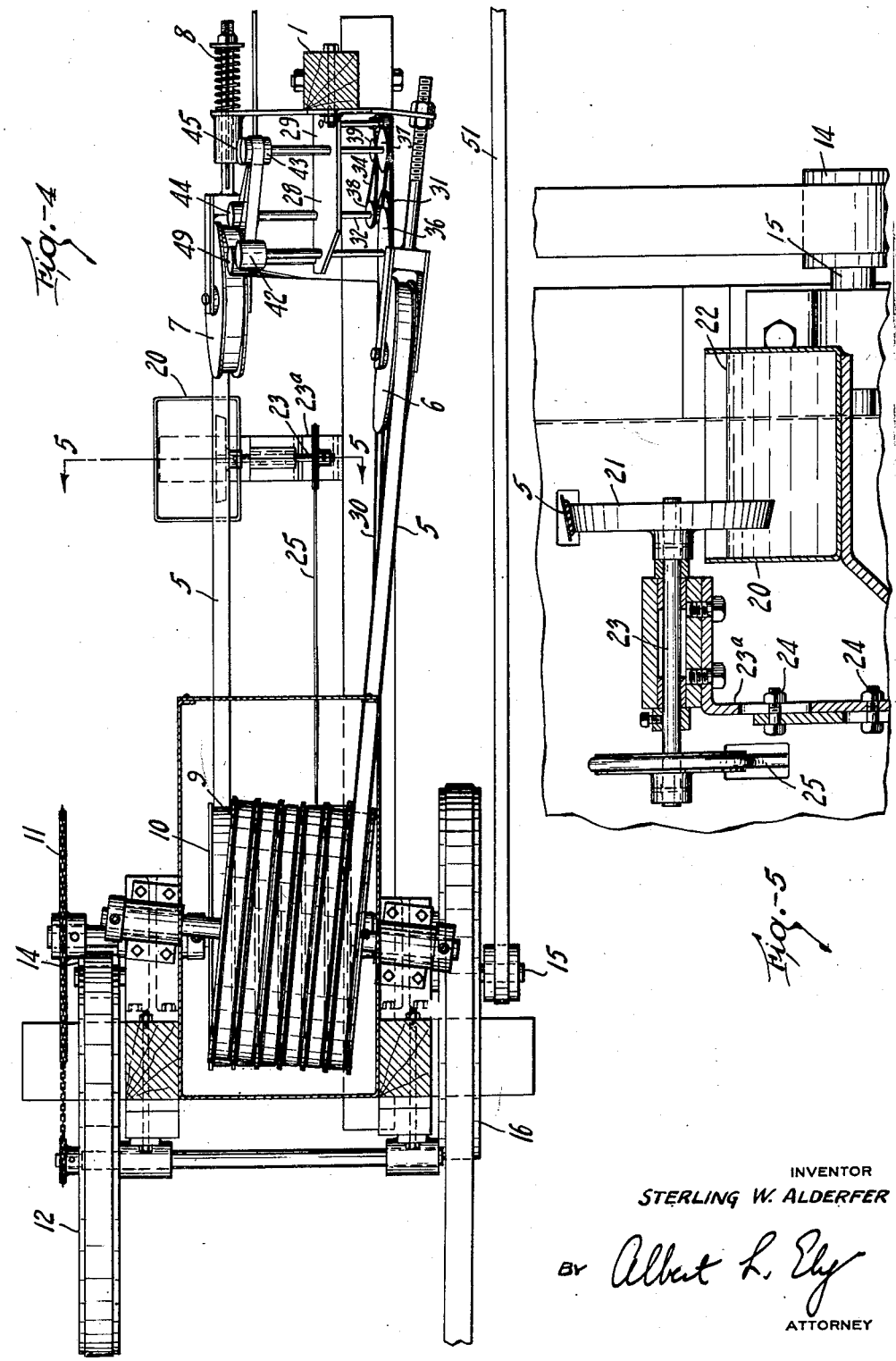

June 8, 1937.  S. W. ALDERFER  2,083,211
APPARATUS FOR THE MANUFACTURE OF ARTICLES DIRECT FROM LATEX SOLUTION
Filed Oct. 15, 1934   4 Sheets-Sheet 4
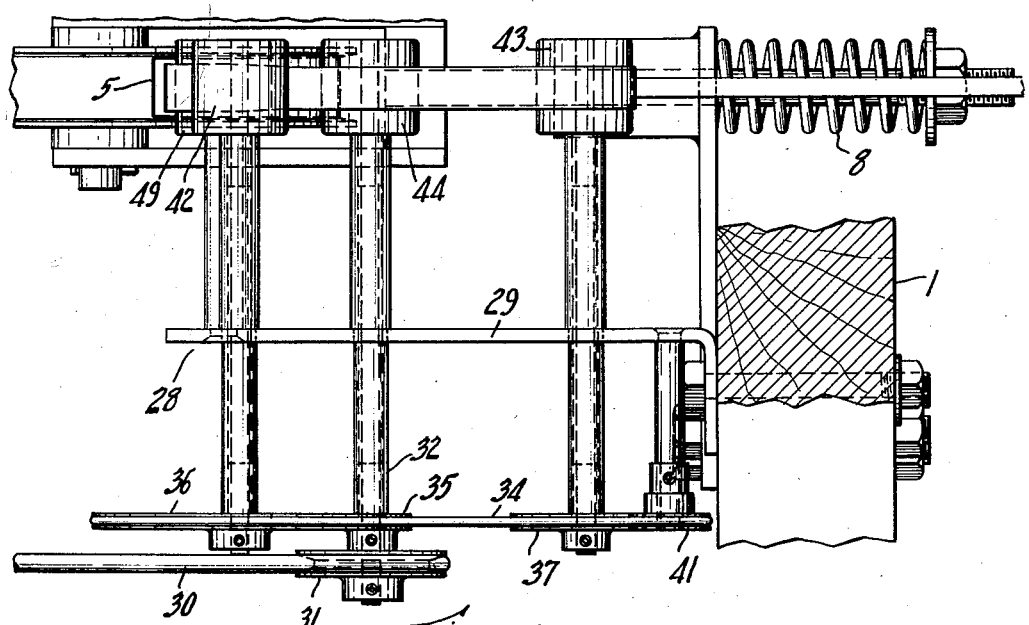
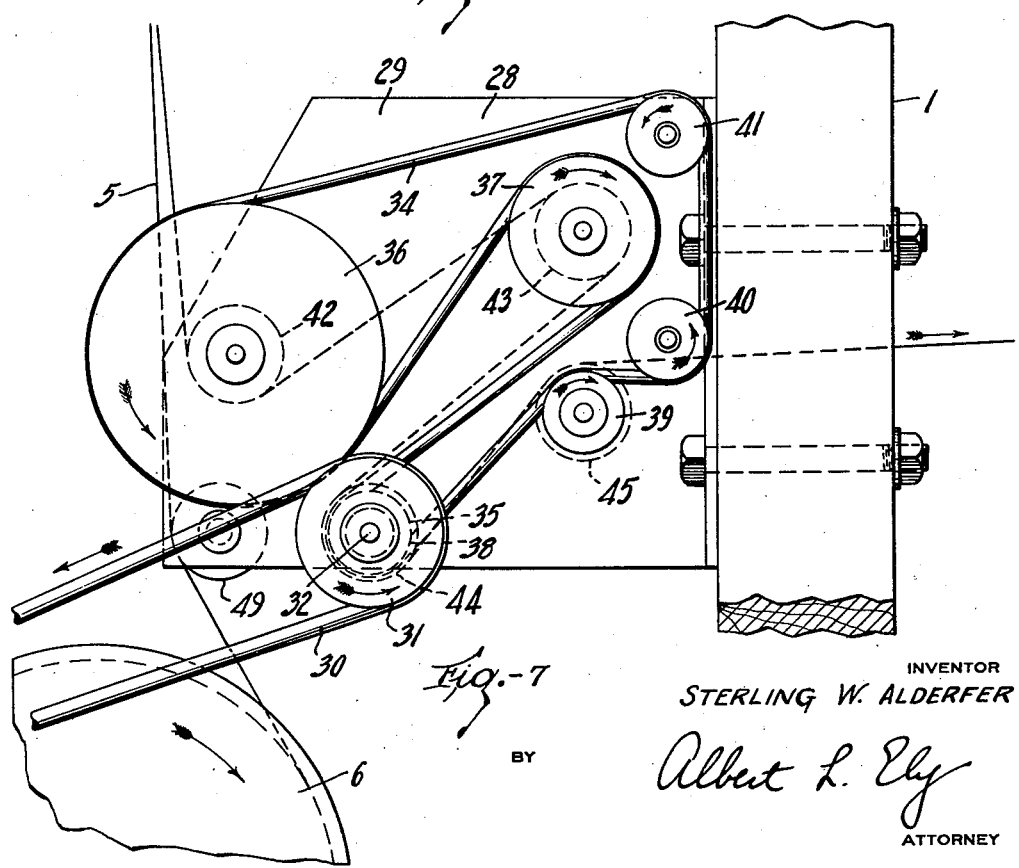
INVENTOR
STERLING W. ALDERFER
BY
Albert L. Ely
ATTORNEY Patented June 8, 1937

2,083,211

UNITED STATES PATENT OFFICE 2,083,211

APPARATUS FOR THE MANUFACTURE OF ARTICLES DIRECT FROM LATEX SOLUTION

Sterling W. Alderfer, Akron, Ohio, assignor of one-half to Edward D. Andrews, Akron, Ohio Application October 15, 1934, Serial No. 748,305

2 Claims. (Cl. 18—15)

The present invention relates to the manufacture of articles containing or composed of rubber and the object is to provide an apparatus for making a rubber tape or filament direct from a solution of latex and the fabrication of the finished article immediately and continuously therefrom.

For the purpose of illustrating the invention, and also as one of the objects thereof, there is shown an apparatus by which the resilient center of a golf ball is made and wound directly from the latex so that the formation of the tape from which the center is wound and the winding of the center is performed continuously. It will be evident that the invention may be extended and applied to the manufacture of other articles where it is desirable to make these articles from a thread or tape of rubber under tension. In certain aspects of the invention, therefore, the golf ball winding machine may be replaced by any suitable fabricating unit which takes the rubber thread or ribbon directly from the ribbon forming mechanism and converts it into the finished or partially finished commodity or article.

It will also be understood that the drawings and description are for the purpose of illustrating a practical and commercial embodiment of an apparatus which has been perfected for carrying out the invention, but other and modified forms of the invention may be devised without departing from the essentials of the conception which is sought to be covered herein. The basic conception may be modified or improved as will be apparent to those skilled in the art.

In the drawings, in which the preferred embodiment of the invention in its best known form is illustrated:

Figure 2 is an end elevation of the unit, looking toward the left in Figure 1;

Figure 3 is a view looking at the interior of the drying and tape forming cabinet, being a vertical section on the line 3—3 of Figure 1;

Figure 4 is a plan view with the cabinet in section on the line 4—4 of Figure 1;

Figure 1:
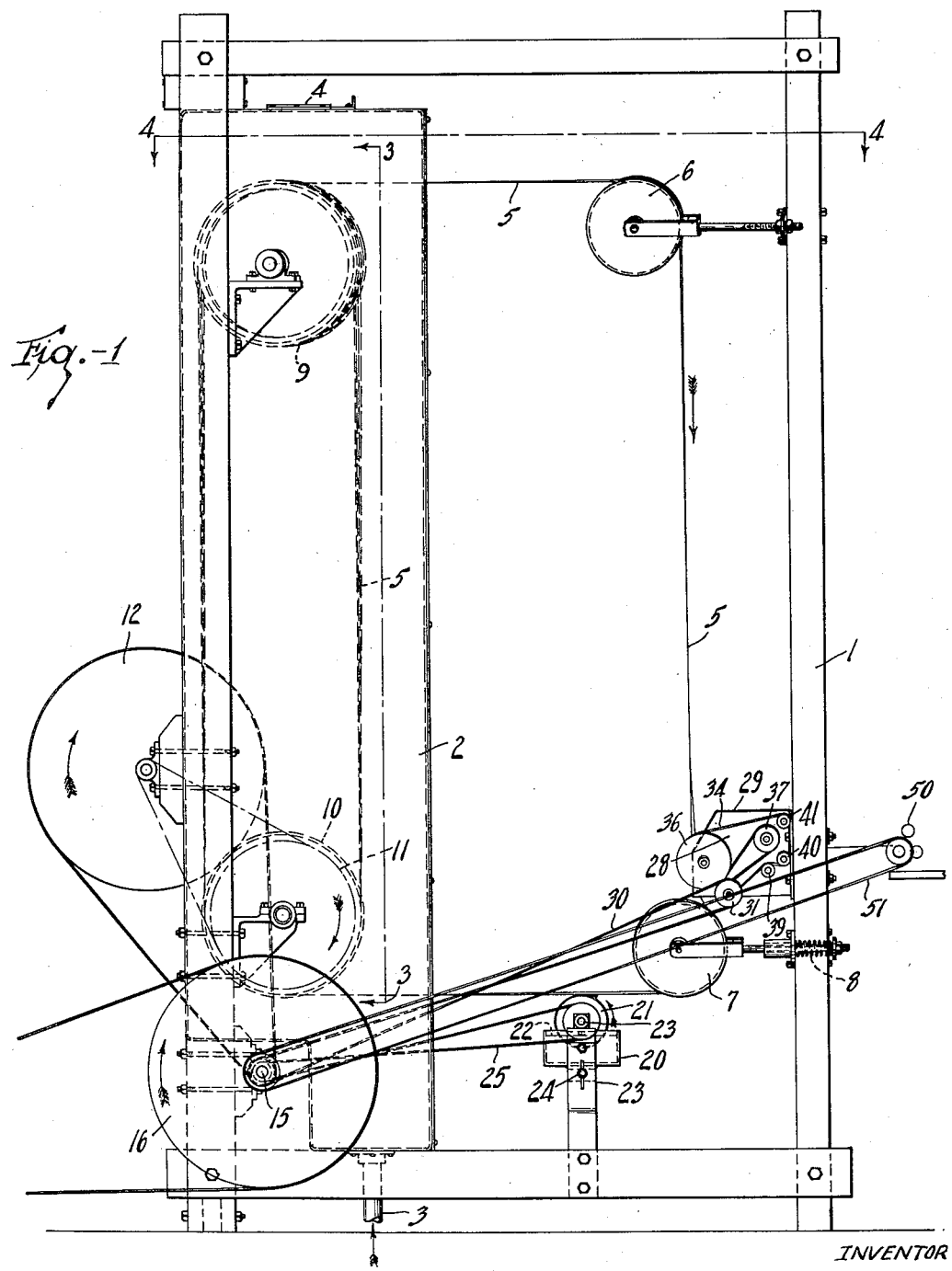
Figure 1 is a side elevation of a complete ribbon making and golf ball winding unit which has been selected as an example of the manner in which the invention may be utilized.

Figure 5 is an enlarged view on the line 5—5 of Figure 4 showing a vertical section of the applicator device for laying the film of liquid latex upon the endless forming and drying belt; and Figures 6 and 7 are top and side views of the tensioning unit, the former view being on the line 6—6 of Figure 2.

The mechanism comprises primarily an endless belt upon which is laid a ribbon of the latex which is deposited thereon in the requisite thickness and which is "set" or dried and forms a vulcanized ribbon or tape of rubber. For this purpose a vulcanized latex solution or emulsion is employed which, when dried, forms the vulcanized rubber tape. The endless belt on which the tape is deposited is carried through a drying chamber or cabinet in which it remains until the ribbon has substantially dried so that it will be capable of the further treatment required. As the tape, carried upon the belt, issues from the cabinet in its dried condition, it is taken off the belt and passed through a tensioning device. For this purpose it is desirable to subject the tape to a progressive series of tensioning steps so that the tape is subjected to a cumulative tension when it passes into the next unit. This is the fabricating unit which in the instant showing is a golf ball winding machine, but it will be understood that in the broader aspects of the invention other fabricating units may be employed.

In the apparatus the numeral 1 represents the frame of the machine and 2 the cabinet or drying chamber which is heated to the requisite temperature by means of burners or the like, or, as shown here, by a blast of hot air introduced through the pipe 3, an adjustable outlet 4 being provided at the top of the cabinet. An endless belt or carrier 5 passes into and out of the cabinet, being threaded in such fashion that it carries the tape for a sufficient length of time to bring the drying to a point so that the tape is self-sustaining and can be tensioned and manipulated. With certain types of vulcanized latex, it has been found that with a temperature of approximately 180° F. and a five minute run through the cabinet, successful results will be secured, but the temperature and duration of the run are subject to variations as may be found necessary or desirable and in accordance with the properties of the latex. It is advisable, however, to keep the temperature of the cabinet to a point somewhat below the boiling point of water to prevent objectionable bubbling of the latex. Under the conditions specified, an even ribbon of rubber will emerge from the drying cabinet.

The belt or carrier is a flexible endless steel belt which passes over an upper guide pulley 6 and a lower guide pulley 7, both mounted on the frame 1. Both of these pulleys may be adjustable to accommodate variations in the belt and the pulley 7 may be spring mounted, as at 8, so as to maintain a constant tension on the belt. Inside of the cabinet 2 are upper and lower grooved drums 9 and 10, the upper drum 9 being set at an angle so as to give the spiral path to the belt, the belt thus passing in an endless circuit in a number of passes around the drums. This gives the requisite length of travel to the belt so as to accomplish the drying. The drum 10 is driven by sprocket and chain 11 from the main pulley 12 which is driven from the sheave 14 on the main drive shaft 15. The power drive is from a sheave 16 on the shaft 15.

It will be seen that as the belt passes out of the cabinet, it is distinctly canted so that the pulleys 6 and 7 are set at an angle.

To lay the film of latex upon the belt the applicator unit, indicated as a whole at 20, is employed (Figure 5). In the form shown, the latex is applied by a roller 21 which dips in a bath 22 of the vulcanized latex which may be kept at a constant level by any suitable apparatus for this purpose. As the belt is tilted at the point of application, the face of the applicator roller is beveled so as to maintain the surfaces in parallelism. In order to lay the film of rubber on the belt, the surface of the applicator roller is spaced from the under surface of the belt a sufficient distance to apply the film without rubbing it off, as it would if the belt and roller were in contact. It has been found that a space of approximately $\frac{1}{32}$nd of an inch will afford the proper clearance for the purpose. The applicator roller is mounted on a shaft 23 in the bracket 23ª which is vertically adjustable, as at 24, on the frame so that the exact spacing of the belt and roller may be secured. The shaft 23 is driven by a belt 25 from the main drive shaft 15, the speed of the applicator roller being considerably higher than the speed of the belt 5 so that a surplus or dam of the latex is built up at the point of application. This assures a full application of the latex over the belt, the space between the applicator roll and the belt acting as a gauge of the thickness of the film applied thereon.

The take-off and tensioning unit is indicated by the numeral 28, being mounted on a bracket 29 which is secured to the frame at an angle to the vertical so as to correspond to the tilt or cant of the belt. This unit is driven by a belt 30 from pulleys 31 mounted on the shafts 15 and 32. A circuitous belt 34 passes around the pulley 35 on the shaft 32 and over a succession of pulleys on the several tension rollers. These pulleys are designated in the order in which the tape passes to the respective rolls, as 36, 37, 38 and 39. Idler pulleys 40 and 41 complete the belt circuit. The tension rolls are designated at 42 to 45 inclusive and are of substantially the same diameter, but owing to the decreasing size of their respective drive pulleys, the surface speeds of the tension rollers are accelerated so that the tape is successively stretched, it being also noted that a slight stretch may be imparted to the tape from the point where it leaves the belt 5. Each successive roller progressively increases the stretch or tension on the tape. A guide roller 49 may be employed to conduct the belt below the first tension roller.

The degree of tension upon the freshly made rubber tape may be varied in accordance with the specific requirements for the work in hand. In the manufacture of golf balls, it has been found that an eight-to-one tension is desirable. If desired, a still further tension may be exerted upon the tape from the point where it leaves the tension unit to the winding machine.

The fabricating unit is indicated at 50. In this embodiment of the invention a golf ball winding machine is employed. There are numerous types of these machines and it is not necessary to illustrate any particular type in this connection. In making a golf ball, a center is employed and the tape started about the center which is then laid in the machine. The machine is driven by a belt 51 from the main drive shaft at the requisite speed so that the tape is wound up under the requisite tension. It will be observed that as the tape is stretched, it will correspondingly narrow.

The process and apparatus will enable a golf ball to be made more economically and efficiently than by former practices. The tape is formed automatically and automatically fed to and tensioned in the winding operation. In fact, except for the attention in starting each ball no other manual operations are required. If other machines were substituted for the winding machine, it would be possible to fabricate rubber articles directly from the latex. Thus, if, for example, an elastic fabric is to be made, the tape or a succession of tapes may be led directly to the weaving machine. In such case a plurality of tapes may be made by a multiplicity of applicator rolls or the tape making machine may be duplicated. Other applications of the invention may be conceived within the scope of the invention as set forth in the broader and more comprehensive claims.

While a vulcanized natural latex is preferably employed, it is possible to use synthetic emulsions of rubber which have recently been perfected, these being referred to generally as "artificial latex" solutions or emulsions. It will be understood that when the term "latex" is employed in the claims, such substitutes are not excluded therefrom. It will also be understood that prevulcanized latex is not essential as latex compounds may be employed which are compounded with vulcanizing ingredients, the vulcanization taking place during the drying or setting of the latex. It will also be appreciated that while the term "ribbon" is used to designate the rubber filament in some of the claims, this may include threads, filaments, webs or sheets. It is also possible to substitute other materials for the metal belt in some of the broader aspects of the invention.

What is claimed is:

1. An apparatus for forming a rubber filament or the like comprising a heated cabinet, a belt passing into and out of the cabinet, means to apply a film of rubber on the belt and to remove the dried film therefrom, and means to cause the belt to pass in repeated loops comprising a pair of pulleys in the cabinet over which the belt passes, one of said pulleys being set at an angle to the other to impart a spiral path to the belt.

2. An apparatus for forming a rubber filament or the like comprising a heated cabinet, a belt passing into and out of the cabinet, means to apply a film of rubber on the belt and to remove the dried film therefrom, and means to cause the belt to pass in repeated loops comprising a pair of pulleys in the cabinet over which the belt passes, one of said pulleys being set at an angle to the other to impart a spiral path to the belt, the belt passing in repeated turns over the pulleys.

STERLING W. ALDERFER.